United States Patent
Huang et al.

(10) Patent No.: US 7,738,561 B2
(45) Date of Patent: Jun. 15, 2010

(54) MPEG-4 STREAMING SYSTEM WITH ADAPTIVE ERROR CONCEALMENT

(75) Inventors: Ming-Yen Huang, Kaohsiung (TW); Tzu-Liang Su, Sinhua Township, Tainan County (TW); Shih-Hao Wang, Beimen Township, Tainan County (TW); Chung-Neng Wang, Dashu Township, Kaohsiung County (TW); Tihao Chiang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1251 days.

(21) Appl. No.: 10/990,818

(22) Filed: Nov. 16, 2004

(65) Prior Publication Data

US 2006/0104366 A1 May 18, 2006

(51) Int. Cl.
*H04N 7/12* (2006.01)
(52) U.S. Cl. .................................. 375/240.27
(58) Field of Classification Search ............. 375/240.27
See application file for complete search history.

(56) References Cited

U.S. PATENT DOCUMENTS

| | | | | |
|---|---|---|---|---|
| 2001/0040926 | A1* | 11/2001 | Hannuksela et al. ... | 375/240.27 |
| 2005/0024487 | A1* | 2/2005 | Chen ....................... | 348/14.13 |
| 2005/0175109 | A1* | 8/2005 | Vetro et al. ............. | 375/240.28 |
| 2006/0013320 | A1* | 1/2006 | Oguz et al. ............. | 375/240.27 |

OTHER PUBLICATIONS

Guy Cote, Member, IEEE, Shahram Shirani, Member, IEEE, and Faouzi Kossentini, Senior Member, IEEE, "Optimal Mode Selection and Synchronization for Robust Video Communications over Error-Prone Networks", IEEE Journal on Selected Areas in Communications. vol. 18, No. 6, Jun. 2000, p. 952-p. 965.

Susanna Kaiser, Khaled Fazel, "Comparison of error concealment techniques for an MPEG-2 video decoder in terrestrial TV-broadcasting", Signal processing: Image communication 14 (1999) 655-676.

(Continued)

*Primary Examiner*—Y. Lee
*Assistant Examiner*—Richard Torrente

(57) ABSTRACT

An MPEG-4 system with error concealment is provided for video service under the network with packet loss. The MPEG-4 system includes an encoder and a decoder. The encoder uses an intra-refreshment technique is used to make coded bitstream more robust against noise in order to stop error propagation. The rate-distortion optimization criterion is also introduced to adaptively update in synchronization with intra-coded blocks adaptively based on the true network condition with minimal overhead. The Lagrange multiplier is modified to achieve the best rate-distortion balance. In addition, a decoder loop is used in the encoder and is synchronized with the true decoder to achieve the best performance and avoid mismatch with the decoder used in the MPEG-4 system. The decoder is able to achieve resilient decoding from any kind of noise and enhance the reconstructed image quality with spatial and temporal hybrid concealment method. The result shows that a 3.65-9.71 dB further improvement on peak-signal-to-noise-ratio (PSNR) can be achieved in comparison with the existing methods that adopt spatial copy and zero motion concealment in decoding.

10 Claims, 8 Drawing Sheets

OTHER PUBLICATIONS

Stephan Valente, Cecile Dufour, Francoise Groliere and Daniel Snook Video and Communication Group, LEP/Philips Research, France, "An Efficiency Error Concealment Implementation for MPEG-4 Video Streams", IEEE Transactions on Consumer Electronics. vol. 47, No. 3, Aug. 2001, p. 568-p. 578.

Wilson Kwok and Huifang Sun, David Sarnoff Research Center, Princeton, NJ 08543, "Multi-Directional Interpolation for Spatial Error Concealment", p. 455-460, 1993.

Min-Cheol Hong, Harald Schwab, Lisimachos P. Kondi, Aggelos K. Katsaggelos, "Error concealment algorithms for compressed video", Signal Processing: Image Communication 14 (1999) 473-492.

Myeong-Hoon Jo and Woo-Jin Song, Member, IEEE,"Error Concealment for MPEG-2 Video Decoders With Enhanced Coding Mode Estimation", IEEE Transactions on Consumer Electronics. vol. 46, No. 4, Nov. 2000, p. 962-p. 969.

Ming-Yen Huang, Tzu-Liang Su, Shih-Hao Wang, Chung-Neng Wang, and Tihao Chiang, "An Error Resilient System for Streaming MPEG-4 Video over the Internet", Dept. of electronics Engineering, National Chiao-Tung University,1001 Ta Hsueh Rd., Hsinchu,30010, Taiwan,R.O.C., 2005.

* cited by examiner

|   |   |   |
|---|---|---|
| 1 | 1 | 1 |
| 1 | 1 | 1 |
| 1 | 1 | 1 |

FIG. 8

MPEG-4 STREAMING SYSTEM WITH ADAPTIVE ERROR CONCEALMENT

FIELD OF THE INVENTION

The present invention generally relates to an MPEG-4 streaming system, and more specifically to an MPEG-4 streaming system with adaptive error concealment scheme to improve the overall quality of the transmitted video contents over error prone environment.

BACKGROUND OF THE INVENTION

It has been a constant challenge for the research community and the industry to search for a better service quality for video streaming over the error-prone environment such as Internet, as the video bitstreams may be corrupted by random error or suffer packet loss in the channels.

To address the aforementioned problem, the MPEG-4 video coding standard is developed to provide users a new level of performance for various video communication services, such as video-on-demand (VOD) over the Internet or mobile multimedia applications. An MPEG-4 video system uses a robust encoded bitstream and a resilient decoding process. The robust encoded bitstream is used in the encoder to help, with some coding overhead, the recovery from error corruption. One of the methods for creating a robust bitstream is to insert additional intra blocks to stop error propagation in decoder. But the insertion of intra blocks will slightly decrease coding efficiency. Thus, the trade-off of the error propagation and coding efficiency must be built to achieve a good performance for MPEG-4 video encoders.

Cote, Shirani and Kossentini proposed an adaptive intra refreshment (IR) scheme for H.263 under the consideration of rate distortion optimization (IEEE Journal on Selected Areas in Communications, vol. 18, pp. 952-965, No. 6, 2002). The rate distortion optimization is to improve the timing of intra block insertion to achieve the optimized usage of IR based on the Internet conditions.

Another method is to use an error resilient decoding process, which can locate errors and then conceal the lost slices. The error location methods utilize useful header information available at the decoder for coding process resynchronization. For error resilience, MPEG-4 provides several tools, including the resynchronization marker (RM), the data partition (DP), and the reverse variable length coding (RVLC). The optimal usage of the error resilient tools is not specified in the video specification. To further enhance the error-resilient ability, the selection of the optimal parameters, intra refreshment, advanced error detection and concealment methods are required to improve the reconstructed video quality.

Several error concealment methods are developed for either spatial error concealment (SEC) or temporal error concealment (TEC). The SEC techniques exploit the spatial redundancy within a picture, while the TEC techniques exploit the temporal similarity of frames in a sequence. For spatial error concealment, various interpolation methods, such as multi-directional interpolation (Valente, et al., IEEE Transaction On Consumer Electronics, vol. 147, No. 3, 2001), and quadri-linear interpolation (Kwok, et. al., IEEE Transaction On Consumer Electronics, vol. 39, No. 3, 1993), are developed in addition to the widely used bi-linear interpolation (Kaiser, et. al., Signal Processing: Image Communication, vol. 14, No. 6-8, 1999). The multi-directional interpolation needs all neighboring macro blocks (MB) to correctly decide the edge direction in the lost MB and requires much more computational complexity. The quadri-linear interpolation is an area-based interpolation which takes the nearest four pixels to interpolate the recovered pixel. Two refinements are introduced by Kwok et. al. One is to increase the weight of nearer direction and the other is to take average of nearest pixels and their neighboring two pixels instead of nearest pixels only. The refinements will make the visual quality smoother.

For temporal error concealment, blind selection of motion vector such as mean, medium, nearest motion vector of surrounding motion vectors have been used. Boundary matching algorithm (BMA) is the most common method that uses the boundary properties to choose a best motion vector. There are two kinds of BMA. One is using boundary gradient to choose a result which makes the boundary match between lost MB and its neighbors. This method can be called a spatial BMA because it uses the spatial boundary correlation. The other BMA method is using boundary difference between the current frame and the previous frame. This method can be called a temporal BMA because it uses the temporal boundary correlation. Other temporal concealment method, such as decoder motion vector estimation (DMVE), uses search range and surrounding area to find a best motion vector according to temporal BMA or uses search range to refine the best motion vector of neighbors. It is obvious that the DMVE costs much more computational complexity due to testing more motion vectors and surrounding lines used for motion estimation.

As spatial concealment is suitable for the area in which spatial correlation is higher than temporal correlation, and temporal concealment is suitable for the area in which temporal correlation is higher than spatial correlation, several hybrid error concealment methods are developed to take advantages of their respective strength. A general hybrid scheme is that spatial concealment is used for intra-coded video object plane (I-VOP) and temporal concealment is used for predicted video object plane (P-VOP). Further refinement strategies are also developed to improve the performance of the hybrid concealment methods. For example, the majority of I-VOPs excluding the first video object plane (VOP) have temporal correlation; thus, the temporal methods are used to conceal the VOP. For pictures having conditions, such as scene change, fad in, or fad out, and less temporal correlation, the spatial methods are used to conceal the VOP. The approach proposed by Kraiser et, al. uses spatial activity and temporal activity to decide the use of spatial concealment or temporal concealment. Spatial activity is calculated by computing the variance of nearest neighboring macro-blocks. Temporal activity is calculated by computing the mean square error between co-located macro-blocks. When the temporal activity is larger than spatial activity, spatial concealment is used, and vice versa. Other approaches use the boundary smoothness property. The ratio of boundary gradient of lost macro-block to boundary gradient of above and below macro-blocks is used to decide if the boundary gradient of lost macro-block is too large and requires the use of spatial concealment instead of temporal method.

However, as more and more applications and activities are brought to the Internet, the competition for bandwidth and the fluctuation of the bandwidth availability is more severe than before. It is, therefore, necessary to device an MPEG-4 streaming system with adaptive error concealment capability in order to deliver performance to the video services.

SUMMARY OF THE INVENTION

The present invention has been made to overcome the aforementioned drawback of conventional techniques used in MPEG-4 delivery in an error-prone environment. The primary object of the present invention is to provide an MPEG-4 system with error concealment for video service under the network with packet loss.

The second object of the present invention is to provide an encoder for use in an MPEG-4 video streaming system. The encoder uses an intra-refreshment technique is used to make coded bitstream more robust against noise in order to stop error propagation. The rate-distortion optimization criterion is also introduced to adaptively update in synchronization with intra-coded blocks adaptively based on the true network condition with minimal overhead. The Lagrange multiplier is modified to achieve the best rate distortion balance. In addition, a decoder loop is used in the encoder and is synchronized with the true decoder to achieve the best performance and avoid mismatch with the decoder used in the MPEG-4 system.

The third object of the present invention is to provide a decoder which is able to achieve resilient decoding from any kind of noise and enhance the reconstructed image quality with spatial and temporal hybrid concealment method. The result shows that a 3.65-9.71 dB further improvement on peak-signal-to-noise-ratio (PSNR) can be achieved in comparison with the existing methods that adopt spatial copy and zero motion concealment in decoding.

The fourth object of the present invention is to provide a rate distortion optimized intra-refresh (RDIR) method for improving the bit-stream structure according to the network condition to an encoder system with least overhead.

The fifth object of the present invention is to provide an error concealment method combining hybrid concealment scheme and block-based refinement.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein:

FIG. 8 shows a 3×3 first order smoothing filter used in an embodiment of the invention.

DETAILED DESCRIPTION OF THE PREFERRED EMBODIMENTS

Figure 1:
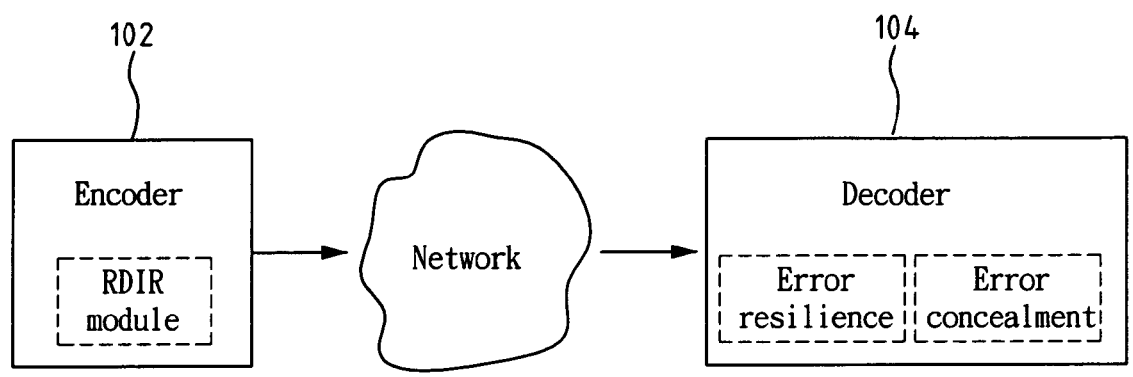
FIG. 1 shows an MPEG-4 system with error concealment according to the invention.
Figure 2:
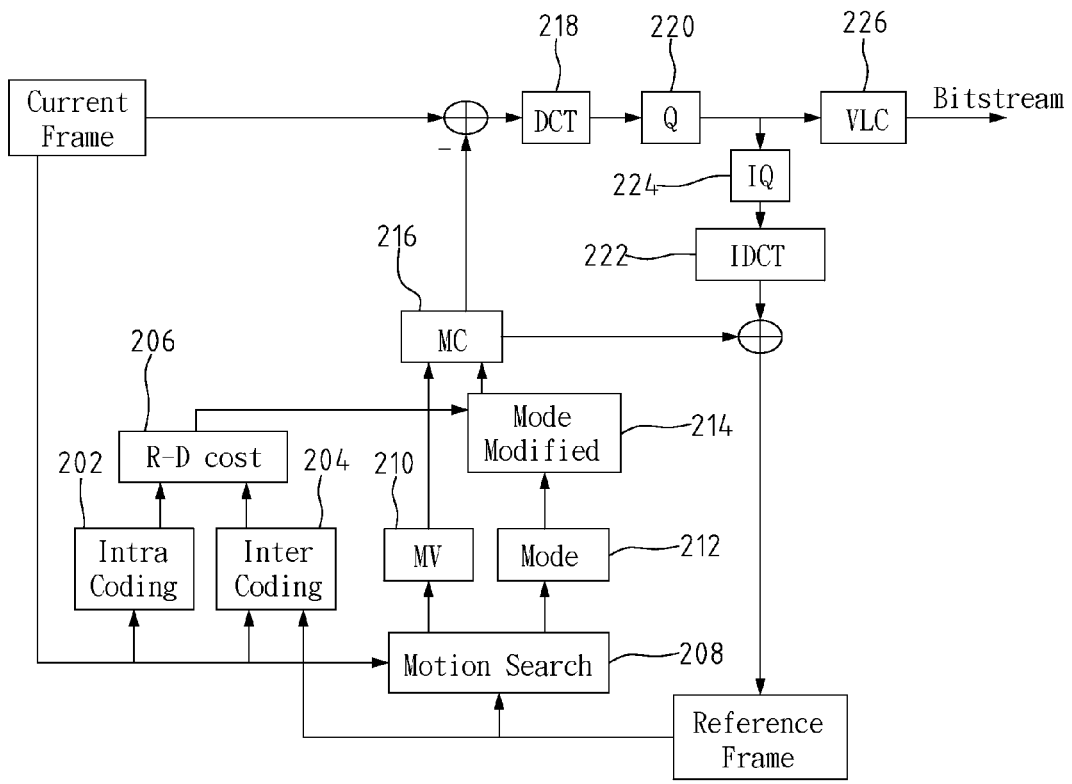
FIG. 2 shows an embodiment of an encoder according to the invention.
Figure 3:
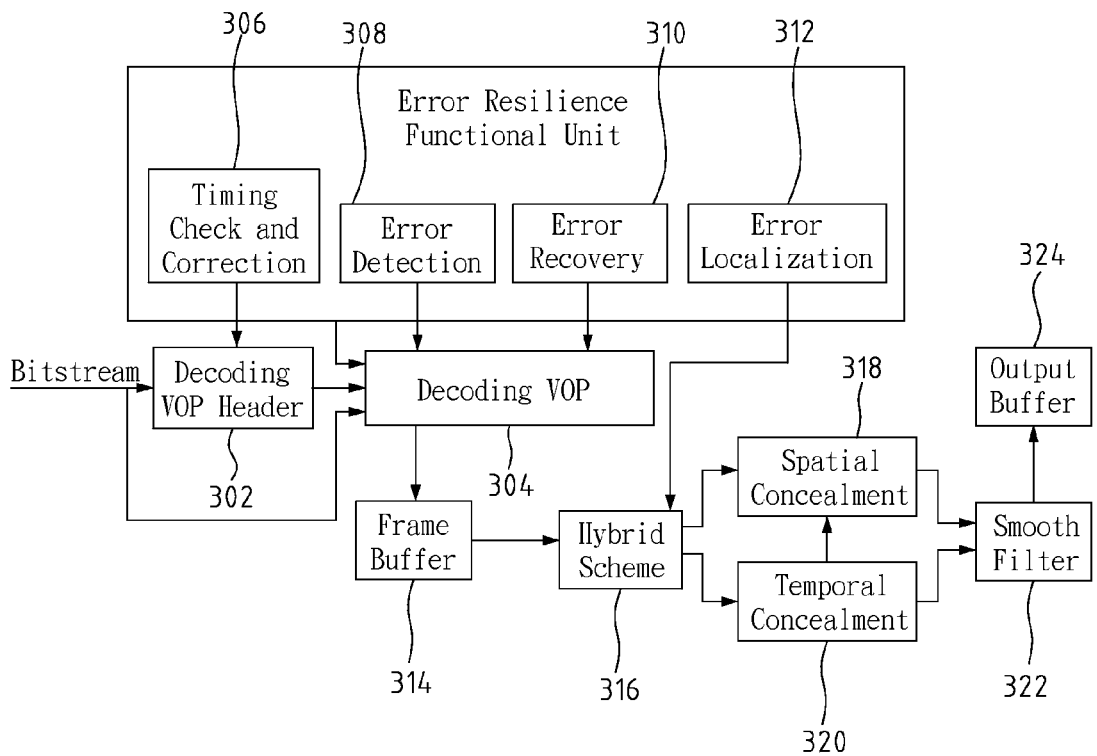
FIG. 3 shows an embodiment of a decoder according to the invention.

FIG. 1 shows a schematic view of an MPEG-4 system of the present invention, including an encoder 102 and a decoder 104. The details of encoder 102 and decoder 104 are illustrated in FIG. 2 and FIG. 3, respectively. As shown in FIG. 2, an encoder includes an intra-coding module 202, an inter-coding module 204, a rate-distortion (R-D) cost decision module 206, a motion search module 208, a motion vector (MV) module 210, a mode module 212, a mode modified module 214, a motion compensation (MC) module 216, a discrete cosine transform (DCT) module 218, a quantization (Q) module 220, an inverse discrete cosine transform (IDCT) module 222, an inverse quantization (IQ) module 224, and a variable length coding (VLC) module 226. For the encoder to generate error resilient bitstreams, an error probability model is built for passing each macro-block (MB) of the bitstream through the model. The distortion of the MB is calculated from the reconstructed images with and without errors and the weighting follows the accumulated error probability. If the R-D cost to encode the current MB as inter-coding mode is lower than that of the intra-coding mode, the inter-coding mode is selected; otherwise, the intra-coding mode is selected. Such a criterion will bring the most efficient usage of intra blocks insertion under similar service quality. After the coding mode is decided, the current MB is encoded and the coded bitstream is passed to a transmitter.

As shown in FIG. 3, the decoder of the present invention includes a decoding VOP header module 302, a decoding VOP module 304, a timing check and correction module 306, an error detection module 308, an error recovery module 310, an error localization module 312, a frame buffer 314, a hybrid scheme module 316, a spatial concealment module 318, a temporal concealment module 320, a smooth filter 322, and an output buffer 324. First, a received bitstream is parsed to look for continuous resynchronization markers (RM). A successful bitstream parsing indicates that no syntactic errors occur, and the normal decoding resumes. If there is any syntactic error, the decoder will jump to the next RM to resume the decoding processes. After one frame is fully reconstructed, the proposed error concealment algorithm is applied based on the available information from the received bits.

To enhance the ability of error resilience, matching solutions over both the encoder and decoder ends are provided. At the encoder, the rate distortion optimized intra-refresh (RDIR), originally developed as a more effective solution for error propagation, is provided to improve the bit-stream structure according to the network condition. The intra-refresh technique inserts intra-blocks instead of inter-blocks in P frame to prevent serious error propagation over the error-prone network. Since the intra-coding block sacrifices more bits, it will become inefficient when the network condition varies over time. To improve this situation, intra block insertion with R-D optimization adaptive to channel condition can provide the most compact encoder system with least overhead.

Figure 4:
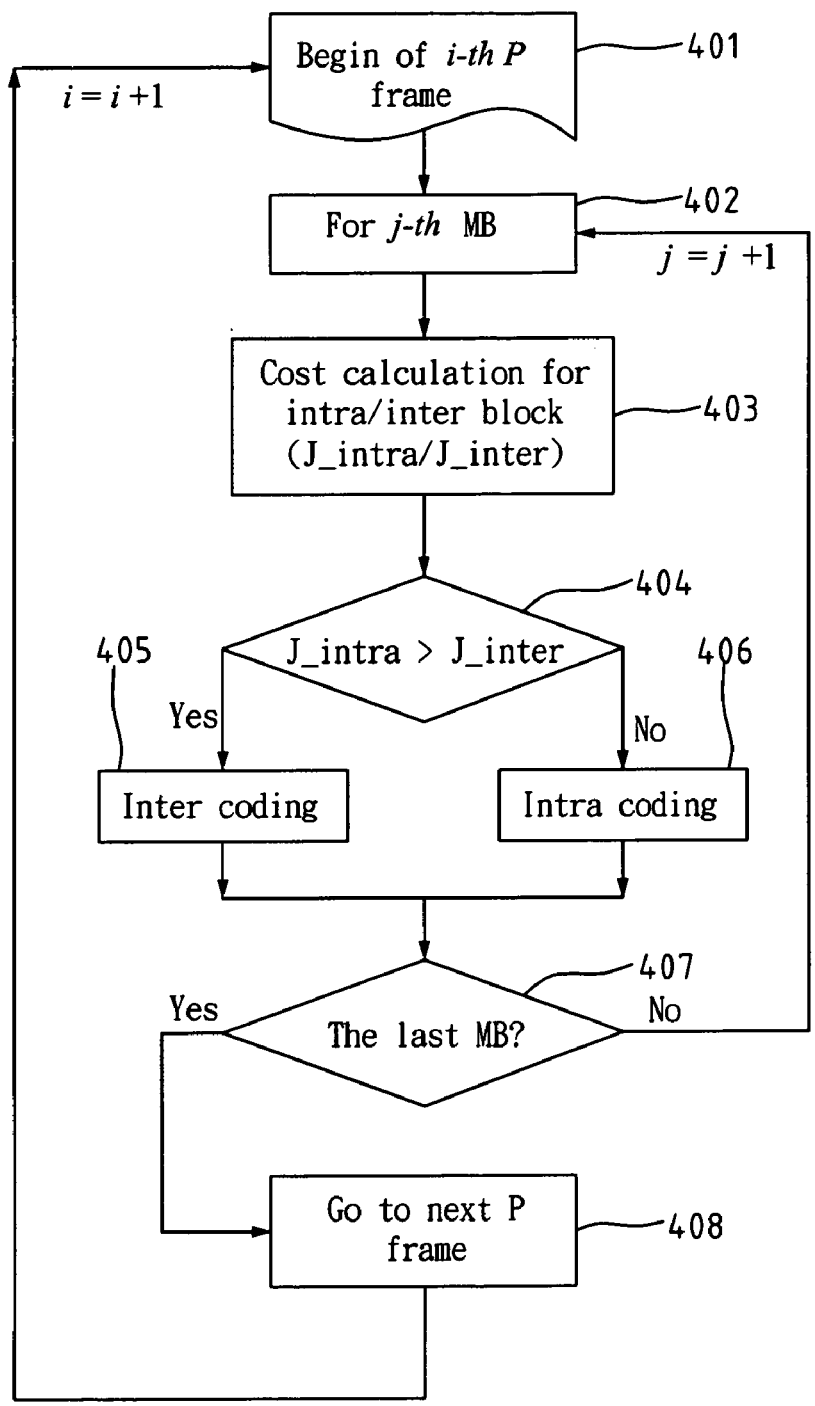
FIG. 4 shows an RDIR encoding flowchart used in an embodiment of the invention.

The RDIR design flow is shown in FIG. 4. Starting with step 401, the beginning of the i-th P frame is read, and for each j-th MB (step 402), the cost for intra and inter blocks, denoted as $J_{intra}$ and $J_{inter}$ can be computed, as shown in step 403, by the following Lagrangian formula:

$$J = D_q + \lambda \cdot R$$

where J: Lagrangian cost
λ: Parameter used to control coding bit rate in encoding process
$D_q$: Distortion induced from residue quantization
R: Bits used in coding a macroblock A better mode for individual MB can be found by taking both distortion and bitrate into consideration. Not only quantization distortion but concealment error must be included for transmission over packet switch network without reliable quality of service (QoS). Therefore, the distortion with concealment combined with packet loss rate is taken into account for RD-cost calculation. After the cost J is decided, the mode with minimal J is chosen as the current MB coding mode, as in step 404. If $J_{int\_ra}$ is greater than $J_{int\_er}$, the intra-coding mode is chosen, as in step 405; otherwise, the inter-coding mode is used, as in step 406. In step 407, if this is the last MB, the process continues to process the next P frame as in step 408; otherwise, the process returns to step 402 and continues processing the next MB of the current P frame. For error prone environment, the distortion of D will suffer more serious quality loss. It comes from both the original quantization error and the errors introduced when concealing the lost MB from nearby MB. So the above formula needs to be modified as $$J = (D_q \cdot (1-p) + D_c \cdot p) + \lambda \cdot R$$

where
$D_q$: Distortion induced from residue quantization
$D_c$: Distortion induced from no-so-perfect concealment algorithm
p: Channel packet loss rate To achieve the R-D optimization under the proposed intra-refresh encoding, the parameter of λ needed to be updated every frame to control the bits used under the same distortion. The updating formula is as follows:

$$\lambda_{n+1} = \lambda_n \left(1 + a\left(\sum_{i=1}^{n} R_i - n \cdot R_{target}\right)\right), \quad a = \frac{1}{20 \cdot R_{target}}$$

The parameter of α comes from a variety of experimental trials for buffer control. The packet loss rate is used to model the internet protocol. Using network condition to model the situation at the decoder is expected to reconstruct better image quality. If the modeling is 100% accurate, the same quality as transmitted one in error prone environment can be obtained.

On the other hand, resynchronization markers (RM) are enabled to stop the collapse of decoder to handle the packet loss. If the addresses of MBs are discontinued, the decoder will skip to the next resynchronization marker and restart decoding. Since the remaining parts from the error starting point to next RM will be dropped due to the uncertainty of the content, the length between RMs may have great influence over the reconstruction quality. If the length is long enough to be able to contain several blocks of information, it will suffer serious quality information loss with packet loss. However, if the length is too short, the redundant information will be distributed in the bit-stream and make the encoding inefficient. The tradeoff is chosen according to the application domain. Considering the application of VOD application under the bit-rate of above 256 k bits per second (bps), using the 1000 bits as the length of each video packet is a suitable selection.

A robust streaming system needs to have an error resilient decoding process and a good error concealment method. Error resilient process is to prevent the decoding process from crash. Error concealment method helps to improve the image quality corrupted by the transmission error. As shown in FIG. 3, decoding VOP header module 302 and decoding VOP module 304, which are at the middle part of FIG. 3, constitute an original decoder. The upper part of FIG. 3, including error detection module 308, error recovery module 310 and error localization module 312, constitutes the error resilience functional units. Timing check and correction module 306 is also added to handle the VOP header loss. The bottom part of FIG. 3, including frame buffer 314, hybrid scheme module 316, spatial concealment module 318, temporal concealment module 320, smooth filter 322, and an output buffer 324, constitutes the error concealment functional units. The inclusion of error resilience functional units and error concealment functional units can realize a robust decoding system.

Figure 5:
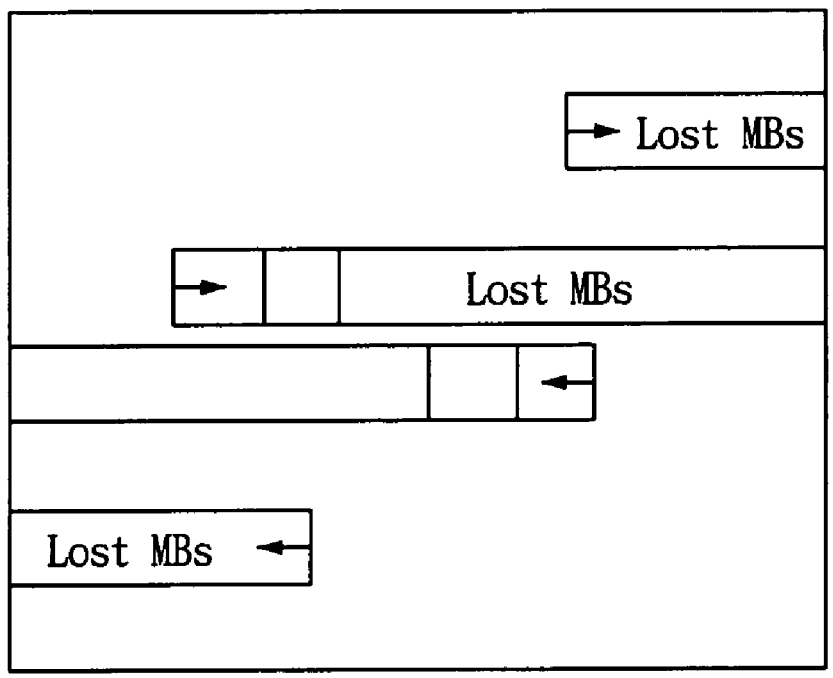
FIG. 5 shows a schematic view of bi-directional error concealment used in the embodiment of the invention.

Error concealment uses the localizations of lost MBs and neighboring relevant data of lost MBs to conceal the corrupted VOP. To achieve good concealment results requires a simple and high performance method and using relevant data as much as possible. Because error concealment is an additional process to the original decoding process, the extra computational complexity will slow down the decoding rate. The bi-linear interpolation is chosen for spatial concealment and temporal BMA for temporal concealment due to their middle computational complexity and high performance. Other interpolation methods can also be used for the same purpose. The hybrid scheme is used to decide when to use spatial or temporal concealment. Because error concealment uses relevant data to conceal the lost MBs, using relevant data as much as possible can make concealment method works well. The bi-directional error concealment is used in the present invention, as shown in FIG. 5.

There are three innovations in the error concealment algorithm used in the present invention. The first is using a less complexity hybrid scheme to choose when to use spatial concealment or temporal concealment. The second one is to implement block-based concealment to refine general MB-based method. Finally, a simple smoothing filter is used for improving visual quality.

Based on the previous observations, spatial concealment is suitable for fast motion or low detailed sequences since the correlation across successive frames is smaller than the correlation of pixels within the frame. In other words, temporal concealment is suitable for slow motion or highly detailed sequences. The temporal concealment can avoid visible blocking artifacts introduced by the spatial concealment. Thus, an adaptive temporal/spatial error concealment scheme is present to provide video contents of better picture quality. Several considerations to select spatial error concealment or temporal error concealment and block-based concealment are included in the adaptive hybrid error concealment method of the present invention.

Reference hybrid concealment methods use certain statistics characteristics such as temporal activity, spatial activity, or boundary similarity to decide to use spatial concealment or temporal concealment. The methods take more extra computational complexity to get the information. For example, if the boundary difference from BMA result is larger than the threshold, spatial concealment is used to conceal the MB which may have less temporal correlation. If the boundary difference from BMA result is smaller than the threshold, the result of temporal concealment is used to conceal the MB.

By observing the motion vectors in the sequence, when the motion vector is large, the correlation between surrounding motion vectors are very low because of fast motion or motion in great confusion. Spatial error concealment is used when detecting large motion vectors. In the fast motion area or scene change, the temporal correlation may become very low and motion vectors will be in great confusion or intra blocks are added. When the intra blocks are more, the surrounding motion vectors are less and insufficient temporal correlation is available for recovering the MB. Spatial error concealment is used to conceal the MB.

Figure 6:
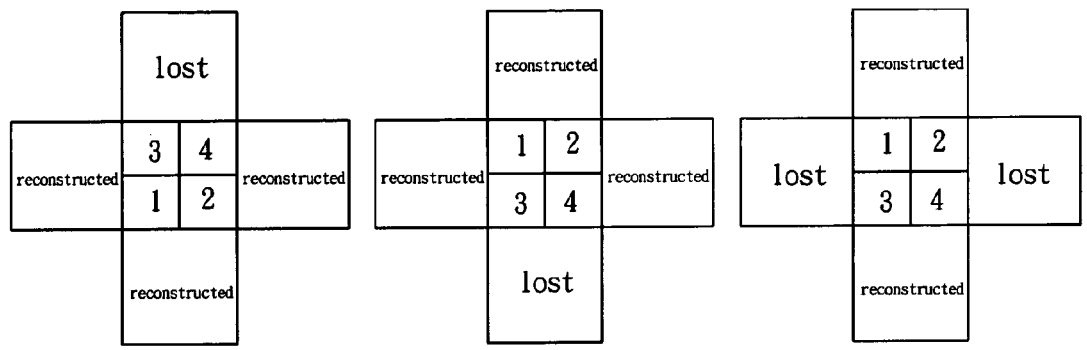
FIG. 6 shows three different concealment orders.

Considering the strong correlation of pixels within a small area and fitting the 4-MV coding mode used by MPEG-4 Simple Profile, the block-based error concealment adopts an 8×8 block as a processing unit. Based on validation of four surrounding MBs and the location of the current block, each of four 8×8 blocks can be concealed in different orders. For example, according to the validation of the four neighbors, there are 15 conditions of concealment order. FIG. 6 shows three different conditions. The numbers within the central MB indicate the concealment order of a MB. The block-based refinement can apply both spatial and temporal concealment in a single MB.

Figure 7:
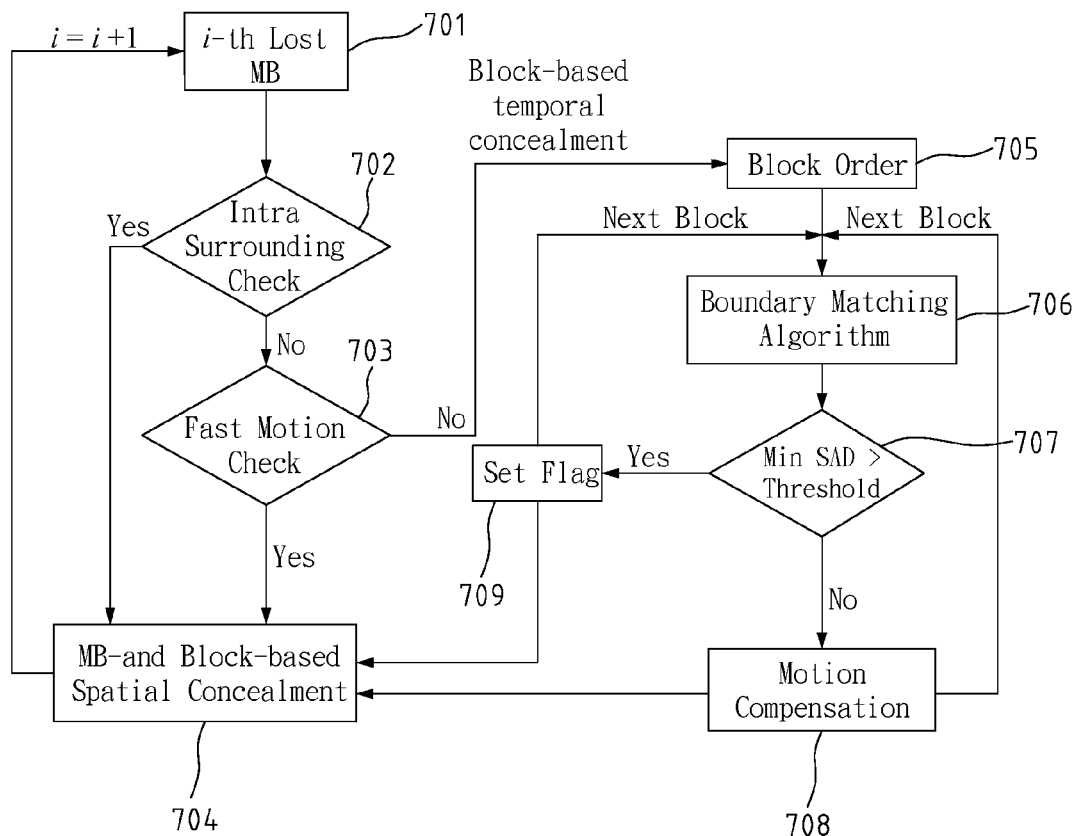
FIG. 7 shows a flowchart of an embodiment of error concealment of the invention.

The error concealment flowchart, combining hybrid concealment scheme and block-based refinement, is shown in FIG. 7. Starting with step 701 with i-th lost MB, the error concealment performs an intra surrounding check in step 702 and a fast motion check in step 703. If the result of the checking is yes, the MB-based and Block-based spatial concealment is used, as shown in step 704. Then, proceed with the next MB. Otherwise, perform a block order in step 705. In step 706, a boundary matching algorithm is computed. In step 707, comparing with the threshold to determine if the threshold has been exceeded. If so, take step 708 to perform motion compensation. Otherwise, set the flag as in step 709, and proceed to use the MB-based and Block-based spatial concealment, as shown in step 704. Then start to process the next MB.

Figure 8:
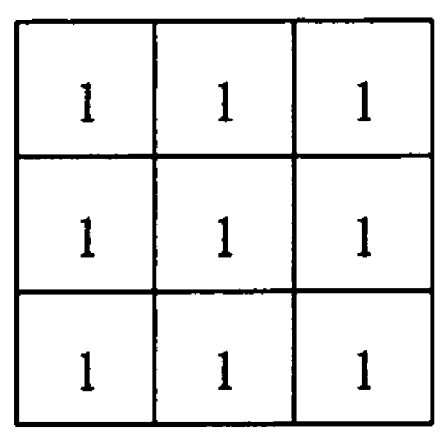

To reduce the blocking effect caused by mismatch of temporal concealment result, a smoothing filter is used on the block boundary of lost MB concealed by temporal concealment. For example, a filter used can be a 3x3 first order filter, as shown FIG. 8. This filter has better performance than the de-blocking filter provided by reference software and another 3×3 second order filter. The smoothing filter can also be applied to spatial concealment results. Because the interpolation only uses the nearest four pixels, some unexpected edges are observed. The smoothing filter can make the interpolation smoother. The same filter can be used to make the results of temporal concealment and spatial concealment smoother.

Several simulation runs are carried out using the system of the present invention. For example, the Foreman and Akiyo sequences are used to simulate the performance of the concealment method in fast motion and slow motion. The coding parameters are as follows: encoding frame rate is 30 frames/sec, decoding frame rate is 10 frames/sec, packet size is 2000 bits, GOP structure is I-P-P . . . , bit-rate is 512 k for normal test. To off-line simulate packet loss condition and see the effect of packet loss rate and concealment method, the random drop with uniform distribution is used to simulate different packet loss rate. Because different lost places will make different results, the average of ten simulation results is taken to obtain the average performance. Seven different types of video sequences such as Foreman, Akiyo, Mobile, Football, Mother&Daughter, Stefan, and Bus, are experimented for 256 bits/sec (low bit-rate), 768 bits/sec (high bitrate). Packet loss rates are 1%, 5%, 10%, 15%. The results show that the fast motion and low detailed sequences need lower threshold to have more spatial concealment to get better quality, while the slow motion or highly detailed sequences need higher threshold. The present invention achieves 0.3~0.7 dB improvement on PSNR for visual quality. The results of the simulation indicate that the present invention can achieve better performance when compared to the conventional methods.

In summary, while compared to the prior arts, the present invention offers two innovations. The first is the use of macroblock-based spatial-temporal hybrid error concealment methods instead of frame-based method. This will help to decide whether a spatial concealment or temporal concealment should be used more accurately and more efficiently. The second is to apply fast decision on the switching between spatial and temporal error concealments. The boundary difference between current frame and previous frame is calculated and a threshold is set to decide whether the spatial mode is satisfactory to be applied. Otherwise, temporal mode will be used to replace spatial mode. The threshold is chosen by simulation on various different conditions of bit-rate, packet lost rate, and different sequences.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An MPEG-4 video streaming system for providing video streaming over error-prone environment, said MPEG-4 streaming system comprising:

an encoder, having a rate-distortion optimization intra-refreshment functional unit, for encoding a series of video images into an encoded bit stream; and a decoder including a decoding module, an error resilience functional unit and an error concealment functional unit, said decoding module decoding said encoded bit stream into decoded video images, said error concealment functional unit receiving said decoded video image and performing a hybrid error concealment method to form error concealed decoded video images, said hybrid error concealment method including an intra surrounding check and a fast motion check based on temporal activity, spatial activity, and boundary similarity in said decoded video images to determine if spatial concealment or temporal concealment should be applied to conceal said decoded video images, said hybrid error concealment method dividing a macro-block of said decoded video images to be concealed into 4 sub-blocks and determining a concealment order for the sub-blocks based on validation of four surrounding macro-blocks of said decoded video images and locations of the sub-blocks, said four surrounding macro-blocks including right, left, top and bottom neighboring macro-blocks of said macro-block to be concealed;

wherein said rate-distortion optimization intra-refreshment functional unit of said encoder computes an intra-coding cost and an inter-coding cost to determine whether intra-coding or inter-coding should be applied in encoding said video images, and said error resilience functional unit of said decoder is used against error occurrence and said error concealment functional unit of said decoder is used to enhance quality of said decoded video images with said hybrid error concealment method.

2. The system as claimed in claim 1, wherein said rate-distortion optimization intra-refreshment functional unit of said encoder having a motion search module, a motion vector (MV) module, a mode module, a mode modified module, a motion compensation (MC) module, a discrete cosine transform (DCT) module, a quantization(Q) module, an inverse discrete cosine transform (IDCT) module, an inverse quantization (IQ) module and a variable length coding (VLC) module, further comprises:
- an intra-coding module;
- an inter-coding module; and
- a rate-distortion cost decision module;
- where said rate-distortion cost decision module determines a coding mode and feeds the determined coding mode to said mode modified module.

3. The system as claimed in claim 1, wherein said decoding module of said decoder further includes a decoding video object plane (VOP) header module, a decoding VOP module, and a frame buffer, and said error resilience functional unit of said decoder further comprises:
- a timing check and correction module;
- an error detection module;
- an error recovery module; and
- an error localization module;
- where said error detection module and said error recovery module interact with said decoding VOP module and said error localization module sends an output to said error concealment functional unit.

4. The system as claimed in claim 1, wherein said error concealment functional unit of said decoder further comprises:
- a hybrid scheme module;
- a spatial concealment module;
- a temporal concealment module; and
- a smoothing filter;
- where said hybrid scheme module uses a macro-block based hybrid error concealment for said hybrid error concealment method to determine and choose said spatial concealment module to perform said spatial concealment or said temporal concealment module to perform said temporal concealment for error concealment.

5. The system as claimed in claim 4, wherein said hybrid scheme module calculates boundary difference between a current frame and a previous frame, and compares said difference to a pre-set threshold to choose whether said spatial concealment module should be used.

6. The system as claimed in claim 4, wherein said smoothing filter is a filter for improving visual quality.

7. The system as claimed in claim 1, wherein said encoder further comprises a decoder loop to synchronize with said decoder.

8. The system as claimed in claim 1, wherein said error concealment functional unit initiates said temporal concealment if said intra surrounding check shows no intra surrounding and said fast motion check shows no fast motion, and otherwise performs said spatial concealment.

9. The system as claimed in claim 1, wherein said encoder performs intra-refresh with a decoder loop that considers both packet loss rate and error concealment.

10. The system as claimed in claim 1, wherein said error concealment functional unit performs bi-directional error concealment for macro-blocks of said decoded video images.

* * * * *